United States Patent
Renggli

(10) Patent No.: US 7,174,704 B2
(45) Date of Patent: Feb. 13, 2007

(54) SPLIT SHROUD EXHAUST NOZZLE

(75) Inventor: Bernard James Renggli, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 10/898,035

(22) Filed: Jul. 23, 2004

(65) Prior Publication Data

US 2006/0016171 A1 Jan. 26, 2006

(51) Int. Cl.
- B63H 11/00 (2006.01)
- B64G 9/00 (2006.01)
- F02K 9/00 (2006.01)
- F03H 9/00 (2006.01)
- F23R 9/00 (2006.01)

(52) U.S. Cl. ............... 60/204; 60/770; 60/226.1; 239/265.33; 239/265.37

(58) Field of Classification Search ............... 60/204, 60/770, 228–230, 232, 771, 226.1; 239/265.13, 239/265.19, 265.27, 265.33, 265.37, 265.31

See application file for complete search history.

(56) References Cited

U.S. PATENT DOCUMENTS

| | | | |
|---|---|---|---|
| 3,779,010 A * | 12/1973 | Chamay et al. ............ 60/226.2 |
| 4,039,146 A * | 8/1977 | Wagenknecht ......... 239/265.25 |
| 4,043,508 A * | 8/1977 | Speir et al. ............ 239/265.19 |
| 4,088,270 A | 5/1978 | Maiden |
| 4,295,611 A | 10/1981 | Wynosky et al. |
| 4,340,178 A * | 7/1982 | Lawson ................ 239/265.31 |
| 4,373,328 A | 2/1983 | Jones ....................... 60/226.2 |
| 4,527,388 A | 7/1985 | Wallace, Jr. |
| 4,537,026 A | 8/1985 | Nightingale |
| 4,592,508 A | 6/1986 | Thornock |
| 4,802,629 A | 2/1989 | Klees |
| 5,165,227 A | 11/1992 | Grieb |
| 5,694,766 A | 12/1997 | Smereczniak et al. |
| 5,706,649 A * | 1/1998 | Robinson et al. .......... 60/226.2 |
| 5,778,659 A | 7/1998 | Duesler et al. |
| 5,806,302 A | 9/1998 | Cariola et al. |
| 5,924,632 A | 7/1999 | Seiner et al. |
| 6,082,635 A | 7/2000 | Seiner et al. |
| 6,195,983 B1 * | 3/2001 | Wadia et al. ............... 60/226.1 |
| 6,289,670 B1 * | 9/2001 | Charier et al. ................ 60/230 |
| 6,502,383 B1 * | 1/2003 | Janardan et al. ............ 60/226.1 |
| 6,532,729 B2 * | 3/2003 | Martens ....................... 60/204 |
| 6,550,235 B2 * | 4/2003 | Johnson et al. ............... 60/204 |
| 6,666,018 B2 * | 12/2003 | Butler et al. ................ 60/226.1 |
| 6,735,936 B2 * | 5/2004 | Rey et al. .................. 60/226.3 |
| 6,813,877 B2 * | 11/2004 | Birch et al. ................. 60/226.1 |
| 6,826,901 B2 * | 12/2004 | Hebert ......................... 60/204 |
| 2003/0126853 A1 * | 7/2003 | Koshoffer et al. ............ 60/204 |
| 2003/0217552 A1 * | 11/2003 | Calabro ........................ 60/771 |
| 2004/0006969 A1 * | 1/2004 | Whurr ......................... 60/262 |

(Continued)

Primary Examiner—William H. Rodriguez
(74) Attorney, Agent, or Firm—Adams Evans P.A.; William Scott Andes

(57) ABSTRACT

A variable geometry convergent-divergent nozzle for a gas turbine engine includes a centerbody extending rearward along a longitudinal axis of the engine which has a throat section of increased diameter. An inner shroud surrounds the centerbody and cooperates with the centerbody to define the throat of the nozzle. An outer shroud surrounds the inner shroud and cooperates with the centerbody to define the exit area of the nozzle. Both shrouds are independently translatable to provide independent control of the nozzle throat area and the nozzle expansion ratio.

26 Claims, 7 Drawing Sheets

U.S. PATENT DOCUMENTS

2004/0187474 A1* 9/2004 Martens et al. ............... 60/204
2004/0216444 A1* 11/2004 Lovett ......................... 60/204
2005/0081509 A1* 4/2005 Johnson .................... 60/226.1
2005/0091982 A1* 5/2005 Renggli et al. ............... 60/770
2005/0172611 A1* 8/2005 Blodgett et al. .............. 60/262

* cited by examiner

SPLIT SHROUD EXHAUST NOZZLE

STATEMENT REGARDING FEDERALLY SPONSORED RESEARCH AND DEVELOPMENT

The U.S. Government may have certain rights in this invention pursuant to contract number MDA972-01-3-0002 awarded by DARPA.

BACKGROUND OF THE INVENTION

This invention relates generally to nozzle for gas turbine engines and more particularly to a variable geometry convergent-divergent nozzle.

Exhaust systems for gas turbine engines which operate over a wide range of pressure ratios (i.e. nozzle throat pressure/ambient pressure or "P8/Pamb") require variable geometry in order to adjust the nozzle throat area ("A8") to meet the demands of the engine cycle, and adjust the nozzle expansion ratio (i.e. nozzle exit area/nozzle throat area or "A9/A8") in order to attain good performance at the various operating points.

Prior art exhaust nozzles include fixed exhaust systems typical of commercial subsonic engines, and variable exhaust nozzles typical of supersonic military aircraft which also use afterburners. Fixed nozzles do not kinematically change their geometry and thus are not designed to operate efficiently over a wide range of nozzle pressure ratios (P8/Pamb).

In prior art variable geometry exhaust nozzles, throat area A8 and expansion ratio control has typically been established by "linking" the A9/A8 ratio to A8 (a kinematically linked area ratio schedule). For example, a circumferential series of overlapping flaps and seals may be used to create a convergent flowpath that establishes A8. A similar set of overlapping flaps and seals is connected to the aft end of the convergent flaps and seals and establishes the divergent portion of the nozzle and thus defines the exit area A9 of the nozzle. The divergent flaps are also kinematically linked via a separate kinematic member (a compression link for instance) to a relatively stationary part of the engine exhaust system such as a duct. The resulting four-bar linkage (duct, convergent flap, divergent flap, compression link) defines the kinematic relationship of the exit area, A9, to the nozzle throat area, A8; and thus defines the A9/A8 ratio schedule as a function of A8. This typically results in an A9/A8 schedule which increases as A8 increases. This type of nozzle design has several disadvantages. Because of the overlapping flap & seal structure, there are numerous leakage paths which reduce operating efficiency, and the large number of parts required increases cost, weight, and maintenance effort, and decreases reliability. Furthermore, for a number of engine cycles, the scheduled A9/A8 ratio vs. A8 relationship will not match the engine cycle demands optimally and thus will not deliver peak nozzle performance at certain key operating points.

Although prior art overlapping flap and seal nozzles exist which enable independent A9 and A8 control they still suffer from excessive complexity and sealing difficulties.

Exhaust systems have been proposed with translating contoured shrouds and fixed internal plugs which would enable some A8 variation. This results in a "scheduled" A9/A8 characteristic where for each A8 there is a unique A9/A8. The translating shroud design is much simpler than the overlapping flap and seal nozzle, has fewer leakage paths, and can be substantially lighter; however, if the engine cycle demands two vastly different nozzle pressure ratios at a given nozzle throat area A8 (for example: P8/Pamb=2.5 at one condition and P8/Pamb=20.0 at another flight condition with nearly the same A8), the nozzle will not be able to attain a geometry which results in good performance for both points.

Accordingly, there is a need for an exhaust nozzle which provides independent control of the throat area and the expansion ratio using a simple, robust structure.

BRIEF SUMMARY OF THE INVENTION

The above-mentioned need is met by the present invention, which according to one aspect provides a nozzle for a gas turbine engine having a longitudinal axis, including a centerbody extending rearward along the longitudinal axis, the centerbody including a throat section of increased diameter relative to the remainder of the centerbody; an inner shroud surrounding the centerbody, the inner shroud having an outer surface and an inner surface, the inner surface including at least a middle section of decreased diameter relative to the remainder of the inner surface, the inner shroud being selectively moveable along the longitudinal axis in forward and aft directions relative to the centerbody; and an outer shroud surrounding the inner shroud, the outer shroud having a forward edge, an aft edge, and an inner surface extending from the forward edge to the aft edge, the outer shroud being movable in forward and aft directions relative to the center body. Means are provided for independently selectively moving the inner and outer shrouds in forward and aft directions relative to the centerbody. The centerbody, the inner surface of the inner shroud, and the inner surface of the outer shroud collectively define a fluid flowpath through the nozzle.

According to another aspect of the invention, a gas turbine engine having a longitudinal axis includes a centerbody; an annular inner shroud having an outer surface and an inner surface, the inner surface including a middle section of decreased diameter relative to the remainder of the inner surface, the inner shroud selectively moveable along the longitudinal axis between forward and aft positions relative to the center body; an annular outer shroud having a cylindrical section having an inner surface and an outer surface, the outer shroud selectively movable between forward and aft positions relative to the center body; and means for independently translating the inner and outer shrouds.

According to another aspect of the invention, A method for controlling a fluid flow through a nozzle having a longitudinal axis includes providing a centerbody extending rearward along the longitudinal axis, the centerbody including a throat section of increased diameter relative to the remainder of the centerbody; providing an inner shroud surrounding the centerbody, the inner shroud having an outer surface and an inner surface, the inner surface including at least a middle section of decreased diameter relative to the remainder of the inner surface; providing an outer shroud surrounding the inner shroud, the outer shroud having a forward edge, an aft edge, and an inner surface extending from the forward edge to the aft edge.

Means are provided for independently selectively translating the inner and outer shrouds in forward and aft directions relative to the centerbody, wherein the centerbody and the inner shroud collectively define a throat area of the nozzle, and the outer shroud and the centerbody collectively define an exit area of the nozzle. The inner shroud is selectively translated to vary the throat area; and the outer shroud is selectively translated to vary the ratio of the exit area to the throat area.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
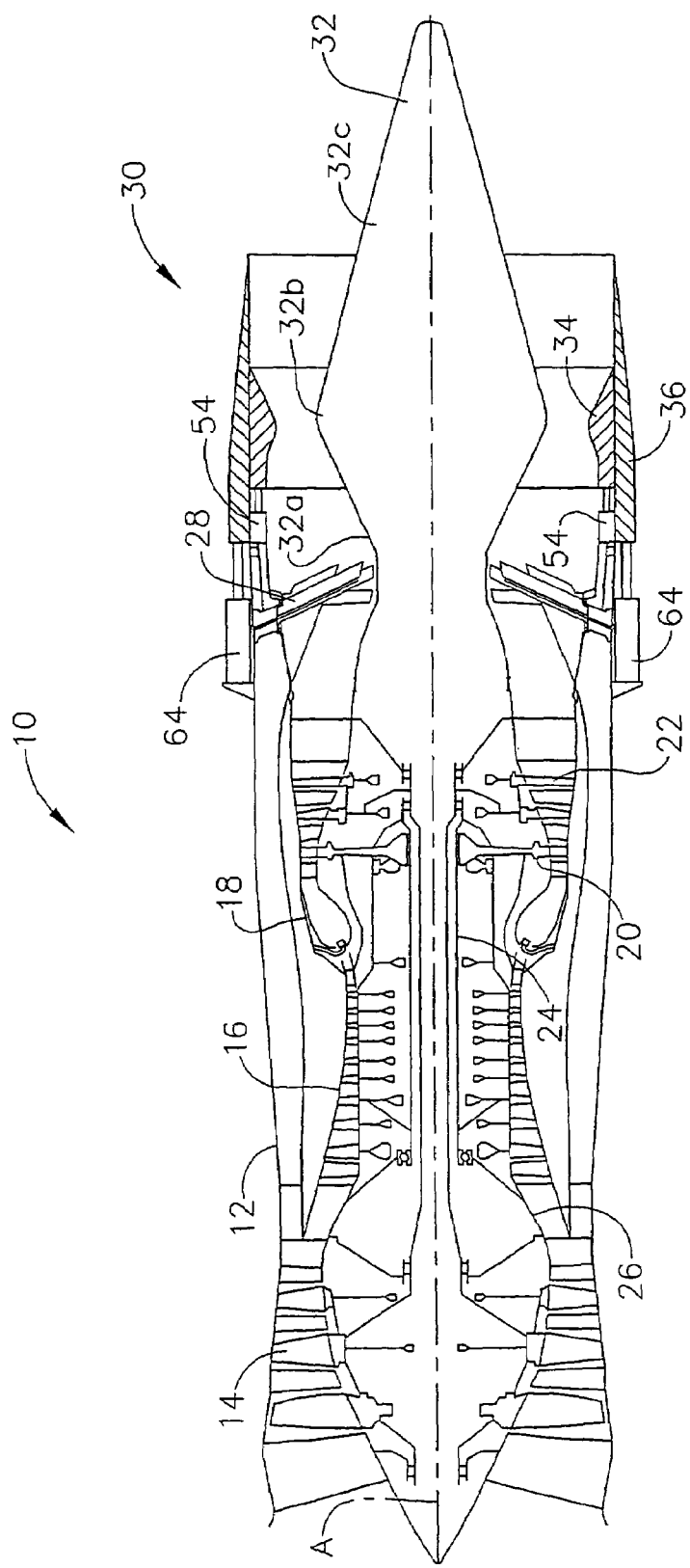
FIG. 1 is a schematic side cross-sectional view of a gas turbine engine.

Referring to the drawings wherein identical reference numerals denote the same elements throughout the various views, FIG. 1 illustrates a representative gas turbine engine, generally designated 10. The engine 10 has a longitudinal center line or axis A and an outer stationary annular casing 12 disposed concentrically about and coaxially along the axis A. The engine 10 has a fan 14, compressor 16, combustor 18, high pressure turbine 20, and low pressure turbine 22 arranged in serial flow relationship. In operation, pressurized air from the compressor 16 is mixed with fuel in the combustor 18 and ignited, thereby generating combustion gases. Some work is extracted from these gases by the high pressure turbine 20 which drives the compressor 16 via an outer shaft 24. The combustion gases then flow into the low pressure turbine 22, which drives the fan 14 via an inner shaft 26. An afterburner 28, or augmentor, may optionally be provided for increasing the thrust of the engine 10 as needed for enhanced aircraft acceleration, maneuverability, or speed.

The engine 10 includes a nozzle 30 constructed in accordance with the present invention. The basic components of the nozzle 30 are a centerbody 32, an inner shroud 34, and an outer shroud 36. The centerbody 32 is centered along the longitudinal axis A of the engine 10 and extends in an aft direction. The centerbody 32 includes, sequentially, a small-diameter tapered forward section 32a, a throat section 32b of increased diameter, and an aft section 32c which tapers in diameter to form an aft-facing conical shape. The centerbody 32 is formed from an appropriate material such as a heat-resistant metal alloy.

Figure 2:
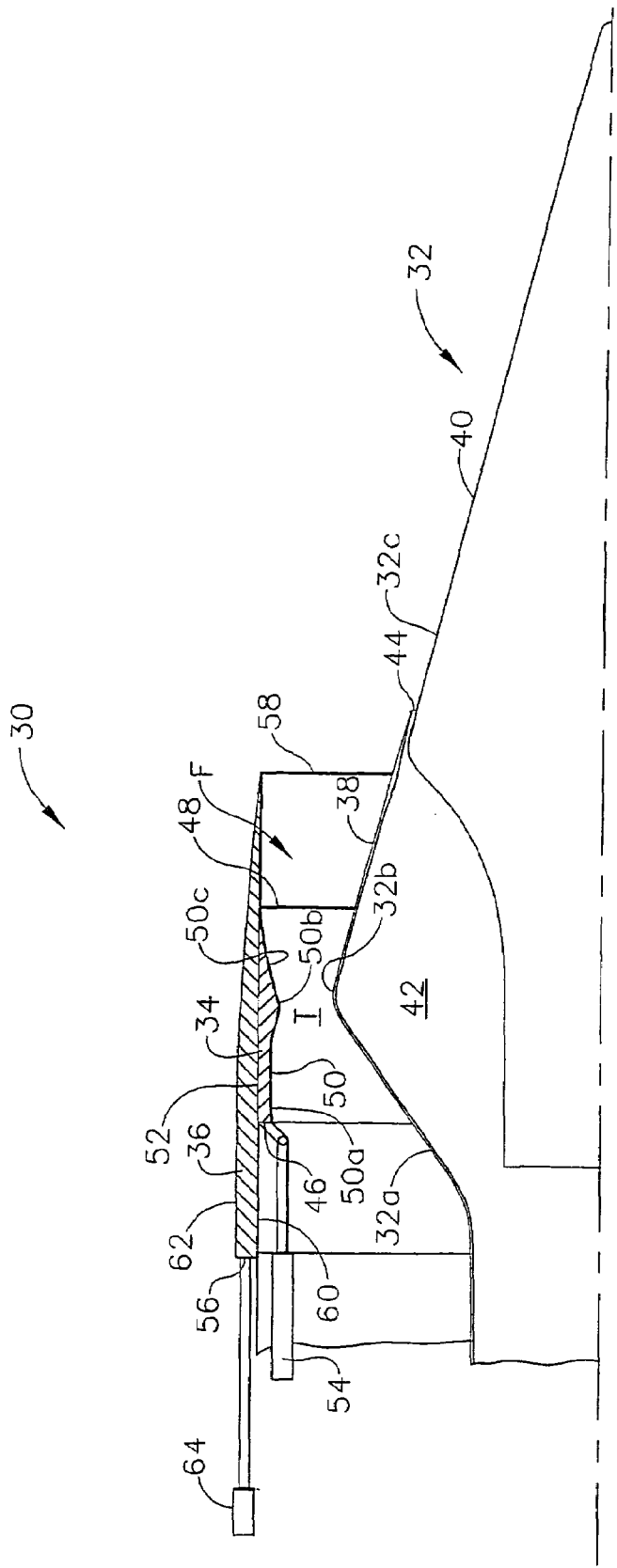
FIG. 2 is a partial sectional view of a nozzle assembly constructed in accordance with the present invention.

FIG. 2 is a half-sectional view illustrating the nozzle 30 in more detail in the illustrated example, the centerbody 32 is hollow and comprises an outer section 38 surrounding an inner section 40 which cooperatively define a plenum 42. The forward end of the plenum 42 is in fluid communication with a source of pressurized air (not shown) such as compressor bleed air or fan bypass air. The aft end of the plenum 42 terminates in an exit slot 44 which allows pressurized air from the plenum 42 to be directed along the surface of the centerbody 32 for boundary layer control or cooling.

The inner shroud 34 surrounds the centerbody 32. In the illustrated example the centerbody 32 and the inner shroud 34 are bodies of revolution, however two-dimensional, oval, or polygonal shapes could also be used. The inner shroud 34 has a forward edge 46, an aft edge 48, an inner surface 50, and a outer surface 52. The inner surface 50 faces the centerbody 32. The inner surface 50 includes in sequential order, a forward cylindrical section 50a, a reduced-diameter middle section 50b, and a tapered aft section 50c. The outer surface 52 is cylindrical or otherwise of constant cross-section along its length. The inner shroud 34 is constructed from appropriate materials such as known heat-resistant metallic alloys, and may be formed as a single integral part. If the inner shroud 34 is built up from multiple components, they are not required to move relative to each other and thus any inter-component gaps may be reliably sealed. The inner shroud 34 is connected to one or more inner shroud actuators 54 of a known type such as hydraulic piston-cylinder assemblies, which are anchored to a relatively static portion of the engine 10. The inner shroud actuators 54 allow the inner shroud 34 to be selectively translated parallel to the longitudinal axis A of the engine 10.

The outer shroud 36 surrounds the inner shroud 34. In the illustrated example the outer shroud 36 is a body of revolution, however a two-dimensional, oval, or polygonal shape could also be used. The outer shroud 36 has a forward edge 56, an aft edge 58, an inner surface 60, and a outer surface 62. The inner surface 60 faces the centerbody 32. The inner surface 60 is generally cylindrical or otherwise of constant cross-sectional area along its length. The outer surface 62 may exposed to external airflow and has a profile shaped to meet relevant design requirements such as drag minimization. The outer shroud 36 is constructed from appropriate materials such as known heat-resistant metallic alloys, and may be formed as a single integral part. If the outer shroud is built up from multiple components, they are not required to move relative to each other and thus any inter-component gaps may be reliably sealed. The outer shroud 36 is connected to one or more outer shroud actuators 64 of a known type such as hydraulic piston-cylinder assemblies, which are anchored to a relatively static portion of the engine 10. The outer shroud actuators 64 allow the outer shroud 36 to be selectively translated parallel to the longitudinal axis A of the engine 10.

The inner surfaces 50 and 60 of the inner and outer shrouds 34 and 36 cooperate with the surface of the centerbody 32 to define an annular gas flowpath "F" through the nozzle 30. The throat "T" of the nozzle 30, where the flowpath "F" has its minimum area, denoted A8, is located between the middle section 50b of the inner surface 50 of the inner shroud 34 and the throat section 32b of the centerbody 32. The exit area, or more precisely the internal exit area denoted A9i, is located between the outer shroud 36 and the centerbody 32, coplanar with the aft edge 58 of the outer shroud.

In operation, translation of the inner and outer shrouds 34 and 36 independently changes the throat area A8 or the nozzle expansion ratio A9i/A8 as desired. FIG. 2 illustrates the nozzle 30 in a high-speed cruise condition. The inner shroud 34 is disposed in a longitudinal position in which the middle section 50b of its inner surface 50 is coplanar with the throat section 32b of the centerbody, providing the minimum nozzle throat area A8. The outer shroud 36 is disposed in a longitudinal position near its aft limits of motion, providing a high nozzle expansion ratio A9$i$/8.

Figure 3:
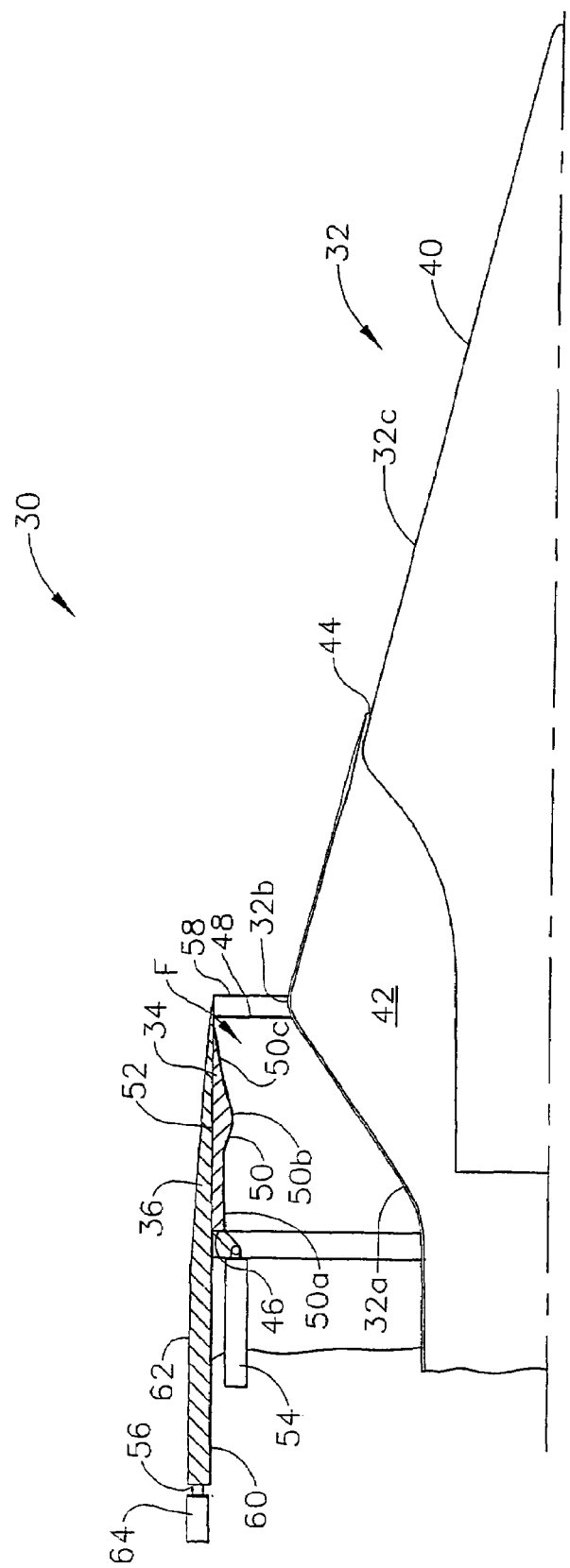
FIG. 3 is a view of the nozzle assembly of FIG. 2 in an alternate operating configuration.

FIG. 3 illustrates the nozzle 30 in a takeoff or low-noise subsonic cruise configuration. The inner shroud 34 is disposed in a forward longitudinal position in which the middle section 50$b$ of its inner surface 50 is displaced forward of the throat section 32$b$ of the centerbody 32, providing the maximum nozzle throat area A8. The outer shroud 36 is disposed in a longitudinal position near its forward limits of motion, providing a near unity nozzle expansion ratio A9$i$/A8.

The independent translation of the inner and outer shrouds 34 and 36 may be controlled by manual inputs to the inner and outer shroud actuators 54 and 64. The shroud positions for different engine operating conditions may also be scheduled as a function of several engine operating parameters such as the engine pressure ratio, compressor inlet temperature, fan speed, free stream mach number, etc. These parameters may be sent to a known type of controller, such as a full authority digital electronic control (FADEC) (not shown) which then sends position commands to the inner and outer shroud actuators 54 and 64.

Figure 4:
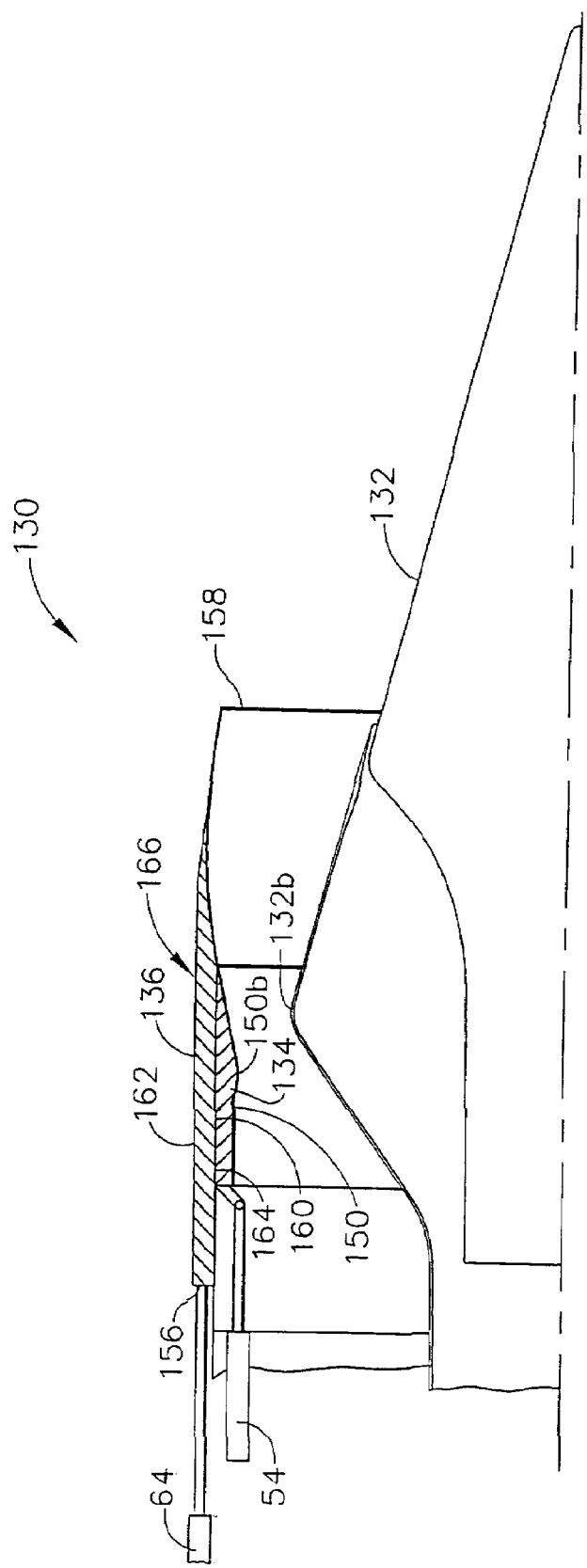
FIG. 4 is a partial sectional view of an alternative nozzle assembly constructed in accordance with the present invention.
Figure 5:
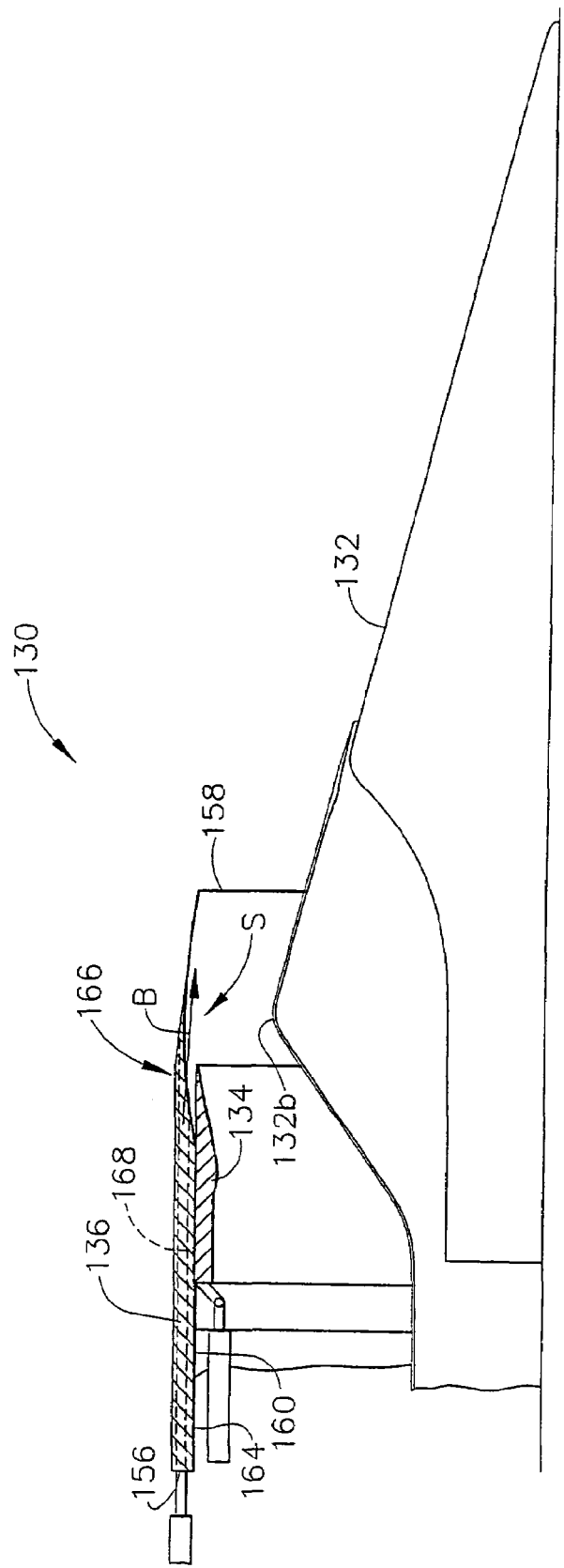
FIG. 5 is a view of the nozzle assembly of FIG. 4 in an alternate operating configuration.

FIGS. 4 and 5 illustrate an alternative nozzle 130. The basic components of the nozzle 130 are a centerbody 132, an inner shroud 134, and an outer shroud 136. The construction of the nozzle 130 and its components are substantially similar in construction to the nozzle 30 described above except for the outer shroud 136, which is described in more detail below.

The outer shroud 136 has a forward edge 156, an aft edge 158, an inner surface 160, and a outer surface 162. The inner surface 160 faces the centerbody 132. The outer shroud 136 differs from the outer shroud 36 in that its inner surface 160 includes a constant area forward section 164 and an aft section 166, which has an arcuate profile as viewed in a side cross-section, such that its diameter is greater at a location between the forward and aft edges 156 and 158 than the diameter at the forward and aft edges 156 and 158. In the illustrated example the outer shroud 136 is a body of revolution, however a two-dimensional, oval, or polygonal shape could also be used.

In operation, translation of the inner and outer shrouds 134 and 136 independently changes the throat area A8 or the nozzle expansion ratio A9$i$/A8 as described for nozzle 30 above. FIG. 4 illustrates the nozzle 130 in a high-speed cruise condition. The inner shroud 134 is disposed in a rearward longitudinal position in which a middle section 150$b$ of its inner surface 150 is coplanar with a throat section 132$b$ of the centerbody 132, providing the minimum nozzle throat area A8. The outer shroud 136 is disposed in a longitudinal position near its aft limits of motion, providing a high nozzle expansion ratio A9$i$/A8. The arcuate contouring of the aft section 166 provides a smooth, low-loss flow transition from the inner shroud 134. The alternative nozzle 130 also has the advantage over the nozzle 30 that the aft section 166 of the inner surface 160 of the outer shroud 136 tends to turn the exhaust flow down the surface of the centerbody 132. This tends to prevent premature flow separation from the centerbody 132.

FIG. 5 illustrates the nozzle 130 in a takeoff or low-noise subsonic cruise configuration. The inner shroud 134 is disposed in a forward longitudinal position in which the middle section 150$b$ of its inner surface 150 is displaced forward of the throat section 132$b$ of the centerbody, providing the maximum nozzle throat area A8. The outer shroud 136 is disposed in a longitudinal position near its forward limits of motion, providing a near unity nozzle expansion ratio A9$i$/A8. In this position, there is an aft-facing discontinuity or step "S" a the aft end of the inner shroud 134. This step can be "filled in" fluidically by an auxiliary fluid flow, as shown by the arrow labeled "B" in FIG. 5. This auxiliary flow may be ducted through a plurality of channels 168 in the outer shroud 136, one of which is shown schematically in FIG. 5, or by other suitable means. The auxiliary flow may be taken from fan bypass air, compressor bleed air, engine bay ejector air, or other known means.

Figure 6:
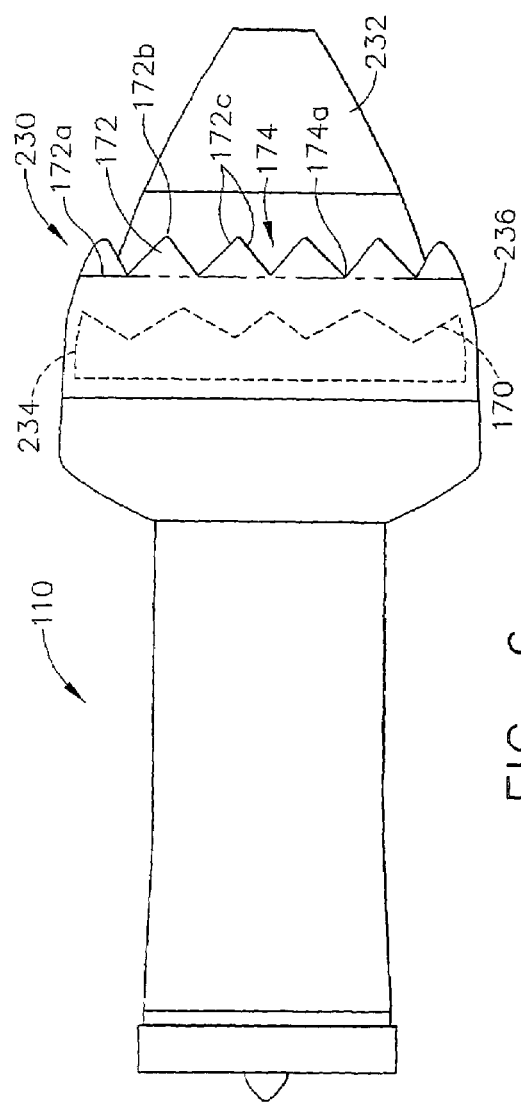
FIG. 6 is a schematic top view of a gas turbine engine including another alternate nozzle assembly.
Figure 7:
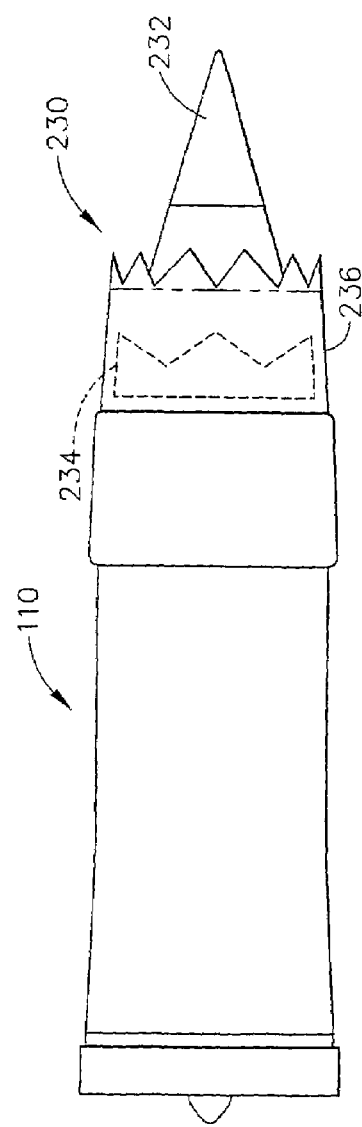
FIG. 7 is a side view of the engine and nozzle assembly of FIG. 6.

FIGS. 6 and 7 illustrate an engine 110 incorporating another alternative nozzle 230. The basic components of the nozzle 230 are a centerbody 232, an inner shroud 234, and an outer shroud 236. The construction of the nozzle 230 and its components are substantially similar in general construction and operation to the nozzles 30 and 130 described above. However, the inner shroud 234, outer shroud 236, and centerbody 232 are all oval-shaped when viewed from the forward or aft directions. This shape may have a "low observable" benefit (e.g. reduced acoustic, radar, or infrared signatures) compared to an axisymmetric nozzle. The nozzle 230 may be any shape which is capable of accommodating inner and outer shrouds surrounding a centerbody as described herein.

The inner or outer shrouds 234 and 236, or both, may also include a plurality of circumferentially or laterally adjoining sawtooth-like chevrons 170 and 172 integrally disposed at their respective aft ends. Each of the chevrons 172 (which are also representative of the chevrons 170) is triangular in configuration, with a base 172$a$ fixedly or integrally joined to the outer shroud 236 circumferentially or laterally coextensively with adjacent chevron bases 172$a$. Each chevron 172 also includes an axially opposite apex 172$b$, and a pair of circumferentially or laterally opposite trailing edges or sides 172$c$ converging from the base 172$a$ to the respective apex 172$b$ in the downstream, aft direction.

The trailing edges 172$c$ of adjacent chevrons 172 are spaced circumferentially or laterally apart from the bases 172$a$ to apexes 172$b$ to define respective slots or cut-outs 174 diverging laterally and axially, and disposed in flow communication with the interior of the nozzle 230 for channeling flow radially therethrough. In the exemplary embodiment illustrated in FIGS. 6 and 7 the slots 174 are also triangular and complementary with the triangular chevrons 172 and diverge axially aft from a slot base 174$a$, which is circumferentially coextensive with the chevron bases 172$a$, to the chevron apexes 172$b$.

In operation, these chevrons 172 encourage mixing of the nozzle exhaust stream with the external airflow and reduce the noise generated by the exhaust nozzle and plume. If the inner shroud 234 includes 170, it they would interact with the exhaust plume as well as the external air flow when the outer shroud 236 is in the fully-forward position, further reducing the noise generated by the exhaust nozzle and plume.

Figure 8:
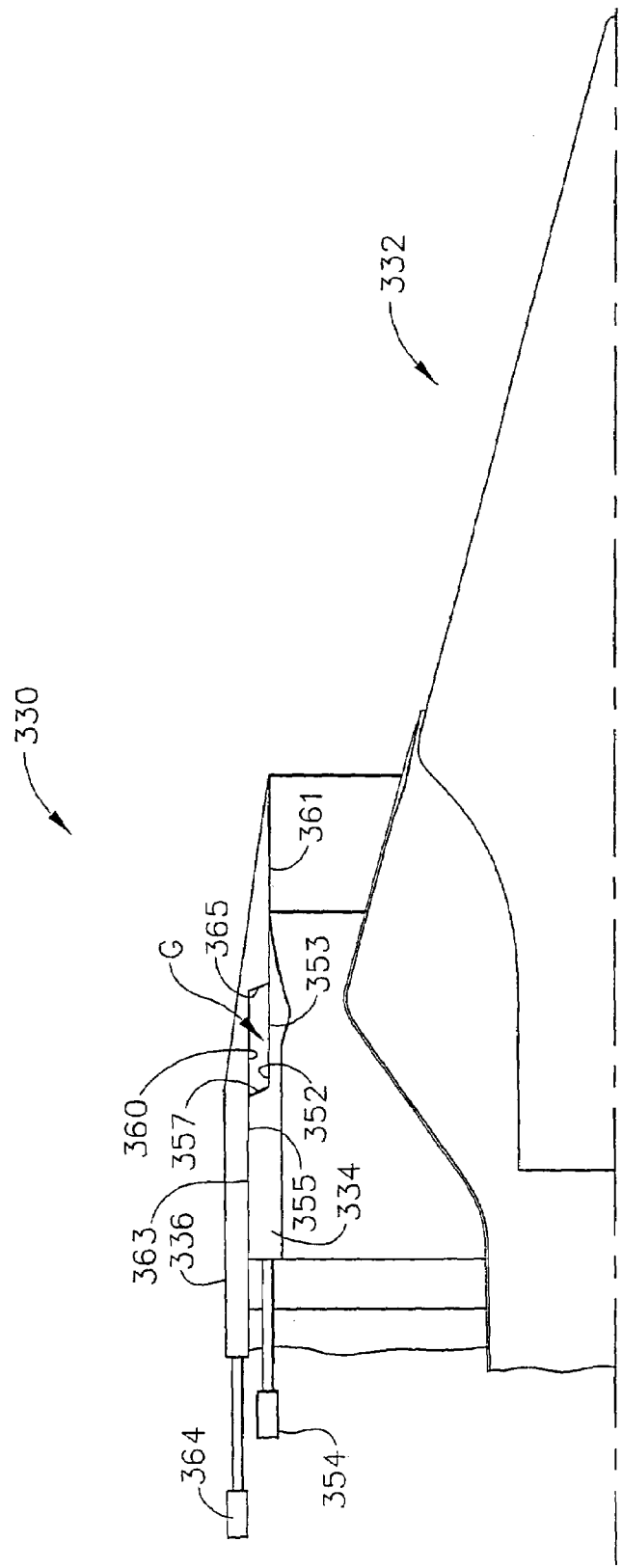
FIG. 8 is a partial sectional view of another alternative nozzle assembly constructed in accordance with the present invention.

FIG. 8 illustrates yet another alternative nozzle 330. The basic components of the nozzle 330 are a centerbody 332, an inner shroud 334, and an outer shroud 336. The nozzle 330 and its components are substantially similar in general construction and operation to the nozzles 30 and 130 described above. It differs primarily in that the inner and outer shrouds 334 and 336 are of a "stepped" configuration.

The outer shroud 336 has an inner surface 360 which includes an aft portion 361 and a forward portion 363 the forward portion 363 has a diameter greater than that of the aft portion 361, and the forward and aft portions 361 and 363 are connected by a generally forward-facing wall 365. The outer shroud 336 is connected to one or more outer shroud actuators 364 of a known type such as hydraulic piston-cylinder assemblies, which are anchored to a relatively static portion of an engine (not shown). The outer shroud actuators 364 allow the outer shroud 336 to be selectively translated parallel to the longitudinal axis of the engine.

The inner shroud 334 has an outer surface 352 which includes an aft portion 353 and a forward portion 355. The forward portion 355 has a diameter greater than that of the aft portion 353, and the forward and aft portions 353 and 355 are connected by a generally aft-facing wall 357. The inner shroud 334 is connected to one or more inner shroud actuators 354 of a known type such as hydraulic piston-cylinder assemblies, which are anchored to a relatively static portion of the engine (not shown). The inner shroud actuators 354 allow the inner shroud 334 to be selectively translated parallel to the longitudinal axis the engine.

The inner and outer shrouds 334 and 336 are overlapped such that the aft portion 353 of the outer surface 352 of the inner shroud 334 mates with the aft portion 361 of the inner surface 360 of the outer shroud 336, and the forward portion 355 of the outer surface 352 of the inner shroud 334 mates with the forward portion 363 of the inner surface 360 of the outer shroud 336. There is a gap "G" between the forward-facing wall 365 of the outer shroud 336 and the aft-facing wall 357 of the inner shroud 334. This gap G permits the inner and outer shrouds 334 and 336 to be independently translated without interfering with each other.

This stepped configuration allows the flowpath surfaces of the inner and outer shrouds 334 and 336 to be placed at the desired radial position while independently placing the inner and outer shroud actuators 364 and 354 at different radial positions. This permits additional design freedom and may result in a more compact configuration than otherwise possible. This stepped configuration may be incorporated into any of the nozzles 30, 130, or 230 described above.

The foregoing has described a variable geometry convergent-divergent nozzle. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A nozzle for a gas turbine engine having a longitudinal axis, comprising:
   a centerbody extending rearward along said longitudinal axis, said centerbody including a throat section of increased diameter relative to the remainder of said centerbody;
   an inner shroud surrounding said centerbody, said inner shroud having an outer surface and an inner surface, said inner surface including at least a middle section of decreased diameter relative to the remainder of said inner surface, said inner shroud being selectively moveable along said longitudinal axis in forward and aft directions relative to said centerbody;
   an outer shroud surrounding said inner shroud, said outer shroud having a forward edge, an aft edge, and an inner surface extending from said forward edge to said aft edge, said outer shroud being movable in forward and aft directions relative to said center body; and
   means for independently selectively moving said inner and outer shrouds in forward and aft directions relative to said centerbody, wherein said centerbody, said inner surface of said inner shroud, and said inner surface of said outer shroud collectively define a fluid flowpath through said nozzle.

2. The nozzle of claim 1 wherein said centerbody includes a forward section positioned forward of said throat section which tapers to a smaller diameter in a forward direction, and an aft section positioned aft of said throat section which tapers to a smaller diameter in a rearward direction.

3. The nozzle of claim 1 wherein said inner surface of said outer shroud defines a substantially constant cross-sectional area from said forward edge to said aft edge of said outer shroud.

4. The nozzle of claim 1 wherein said inner surface of said outer shroud has an arcuate cross-sectional profile such that the diameter of said inner surface at said forward and aft edges is less than the diameter of said inner surface at a location between said forward and aft edges.

5. The nozzle of claim 4 further comprising means for injecting a generally rearwardly-directed auxiliary fluid flow along said inner surface of said outer shroud.

6. The nozzle of claim 1 wherein said centerbody, said inner shroud, and said outer shroud are bodies of revolution about said longitudinal axis of said engine.

7. The nozzle of claim 1 wherein said centerbody, said inner shroud, and said outer shroud are oval in cross-section.

8. The nozzle of claim 1 wherein at least one of said inner and outer shrouds includes a plurality of adjoining chevrons disposed at the aft edge thereof.

9. The nozzle of claim 6 wherein each of said inner and outer shrouds includes a plurality of adjoining chevrons disposed at the respective aft edges thereof.

10. The nozzle of claim 1 wherein at least one actuator is connected to each of said inner and outer shrouds.

11. The nozzle of claim 1 wherein:
    the outer surface of said inner shroud includes an aft portion, a forward portion having a diameter greater than a diameter of said aft portion, and a generally aft-facing wall connecting said forward and aft portions of said outer surface;
    the inner surface of said outer shroud includes an aft portion, a forward portion having a diameter greater than a diameter of said aft portion, and a generally forward-facing wall connecting said forward and aft portions of said inner surface; and
    the inner and outer shrouds are disposed such that the aft portion of the outer surface of the inner shroud mates with the aft portion of the inner surface of the outer shroud, and the forward portion of the outer surface of the inner shroud mates with the forward portion of the inner surface of the outer shroud.

12. A gas turbine engine having a longitudinal axis, comprising:
    a nozzle comprising:
       a centerbody;
       an annular inner shroud having an outer surface and an inner surface, said inner surface including a middle section of decreased diameter relative to the remainder of said inner surface, said inner shroud selectively moveable along said longitudinal axis between forward and aft positions relative to said center body;
       an annular outer shroud having an inner surface and an outer surface, said outer shroud selectively movable between forward and aft positions relative to said center body; and
       means for independently translating said inner and outer shrouds.

13. The gas turbine engine of claim 12 wherein said centerbody includes a forward section positioned forward of said throat section which tapers to a smaller diameter in a forward direction, and an aft section positioned aft of said throat section which tapers to a smaller diameter in a rearward direction.

14. The gas turbine engine of claim 12 wherein said inner surface of said outer shroud defines a substantially constant cross-sectional area in from a forward edge thereof to an aft edge thereof.

15. The gas turbine engine of claim 12 wherein said inner surface of said outer shroud has an arcuate cross-sectional profile such that the diameter of said inner surface at a forward edge thereof and an aft edge thereof is less than the diameter of said inner surface at a location between said forward and aft edges.

16. The nozzle of claim 15 further comprising means for injecting a generally rearwardly-moving auxiliary fluid flow along said inner surface of said outer shroud.

17. The nozzle of claim 12 wherein said centerbody, said inner shroud, and said outer shroud are bodies of revolution about said longitudinal axis of said engine.

18. The nozzle of claim 12 wherein said centerbody, said inner shroud, and said outer shroud are oval in cross-section.

19. The nozzle of claim 12 wherein at least one of said inner and outer shrouds includes a plurality of adjoining chevrons disposed at an aft edge thereof.

20. The nozzle of claim 19 wherein each of said inner and outer shrouds includes a plurality of adjoining chevrons disposed at respective aft edges thereof.

21. The nozzle of claim 12 wherein:
the outer surface of said inner shroud includes an aft portion, a forward portion having a diameter greater than a diameter of said aft portion, and a generally aft-facing wall connecting said forward and aft portions of said outer surface;
the inner surface of said outer shroud includes an aft portion, a forward portion having a diameter greater than a diameter of said aft portion, and a generally forward-facing wall connecting said forward and aft portions of said inner surface; and
the inner and outer shrouds are disposed such that the aft portion of the outer surface of the inner shroud mates with the aft portion of the inner surface of the outer shroud, and the forward portion of the outer surface of the inner shroud mates with the forward portion of the inner surface of the outer shroud.

22. The nozzle of claim 12 wherein at least one actuator is connected to each of said inner and outer shrouds.

23. A method for controlling a fluid flow through a nozzle, comprising:
providing a centerbody extending rearward along a longitudinal axis, said centerbody including a throat section of increased diameter relative to the remainder of said centerbody;
providing an inner shroud surrounding said centerbody, said inner shroud having an outer surface and an inner surface, said inner surface including at least a middle section of decreased diameter relative to the remainder of said inner surface;
providing an outer shroud surrounding said inner shroud, said outer shroud having a forward edge, an aft edge, and an inner surface extending from said forward edge to said aft edge;
providing means for independently selectively translating said inner and outer shrouds in forward and aft directions relative to said centerbody, wherein said centerbody and said inner shroud collectively define a throat area of said nozzle, and said outer shroud and said centerbody collectively define an exit area of said nozzle;
selectively translating said inner shroud to vary said throat area; and
selectively translating said outer shroud to vary the ratio of said exit area to said throat area.

24. The method of claim 23 wherein said inner shroud is movable between forward and aft positions, said throat area being at a minimum size when said inner shroud is at said aft position, and said throat area being at a maximum size when said inner shroud is in said forward position.

25. The method of claim 23 further comprising providing a rearwardly-directed auxiliary fluid flow directed along said inner surface of said outer shroud, said fluid flow being separate from a primary flow through said nozzle.

26. The method of claim 23 wherein said steps of selectively translating said inner and outer shrouds comprises moving at least one actuator connected to each of said inner and outer shrouds.

* * * * *